Dec. 3, 1929.     A. C. HOECKER     1,737,720
COMBINED BUMPER AND JACK FOR AUTOMOBILES
Filed Aug. 15, 1927
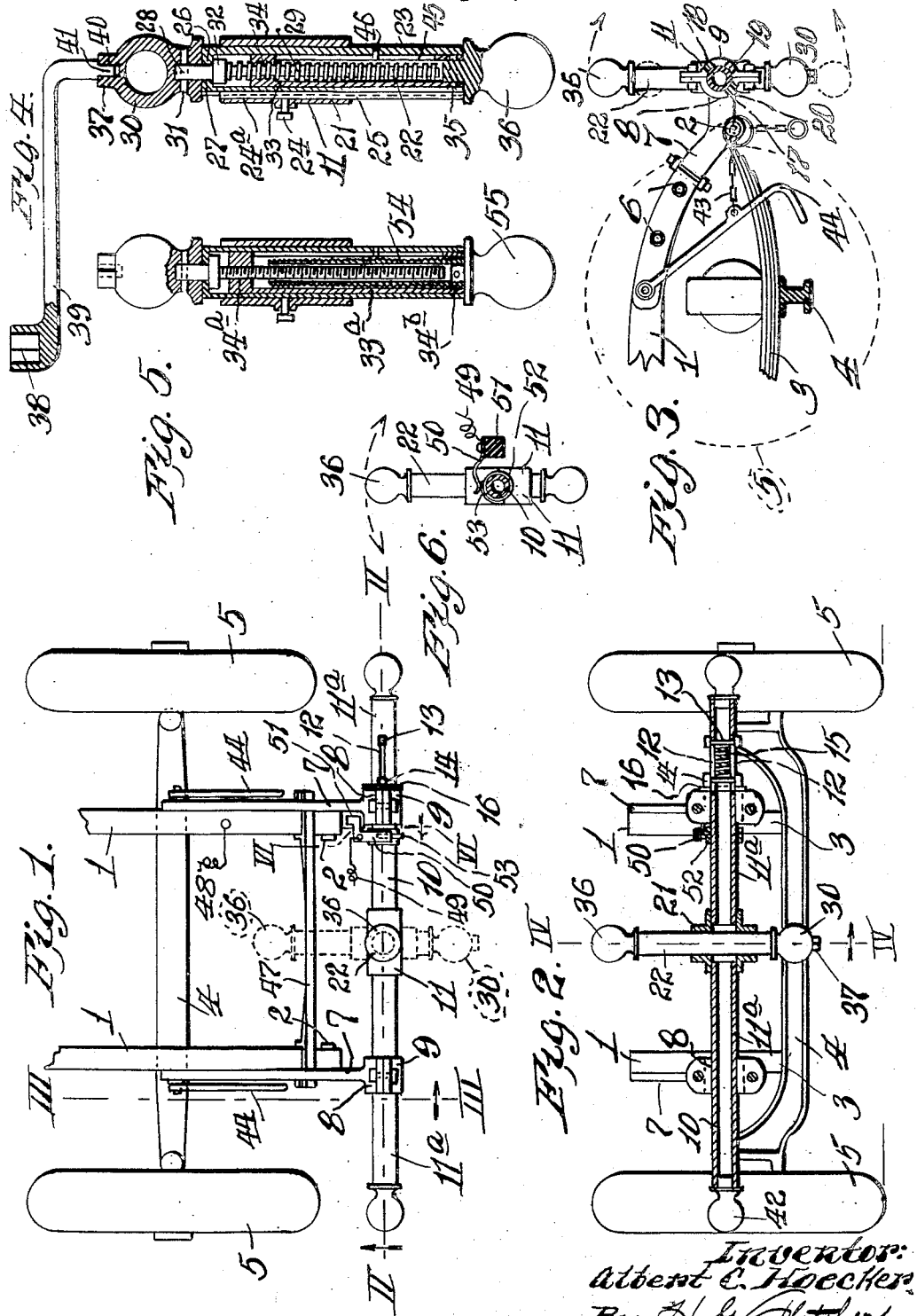
Inventor:
Albert C. Hoecker
By H. G. Hittler
Atty.

Patented Dec. 3, 1929

1,737,720

UNITED STATES PATENT OFFICE

ALBERT C. HOECKER, OF ST. LOUIS, MISSOURI

COMBINED BUMPER AND JACK FOR AUTOMOBILES

Application filed August 15, 1927. Serial No. 212,863.

This invention relates to an improvement in a combined bumper and jack and has for its primary object the purpose of providing a jack which is carried by the bumper and may be used as forming part of the bumper.

Another object of the invention is in providing a bumper carried jack with means whereby the jack can be quickly adjusted to a position in near contact with the pavement ready for lifting operation.

A further object of the invention is in providing a combined bumper and jack with improved means for locking it in different positions.

A still further object of the invention is in providing the combined bumper and jack with means whereby the operator of the automobile cannot start the motor while the jack is in a lifting position.

Other and further objects will appear in the specification and be specifically pointed out in the appended claims, reference being had in the accompanying drawings, exemplifying the invention, and in which:—

Figure 1 is a fragmentary plan view of the front portion of an automobile showing this improved bumper and jack applied thereto.

Figure 2 is a front elevation of Fig. 1 taken on the line II—II and showing part thereof in section.

Figure 3 is a vertical section taken approximately on the line III—III of Fig. 1.

Figure 4 is an enlarged vertical section taken on the line IV—IV of Fig. 2 but showing the jack in a lowered position ready for the lifting operation being applied thereto.

Figure 5 is an enlarged view partly in section of a modified construction of lifting jack.

Figure 6 is a vertical section taken approximately on the line VI—VI of Fig. 1.

Referring by numerals to the accompanying drawings 1 designates the side frames of the vehicle chassis and secured to the forward end of each frame by a bolt 2 is a front spring 3, said springs being mounted on the front axle 4.

The disclosure of this improved combined bumper and jack is shown as applied to the forward end of the vehicle or automobile, although the application thereof can be to the rear of the vehicle as well.

The steering wheels 5 of the vehicle are supported from the axle 4 in the usual manner and extending forwardly from each frame 1 and secured thereto by bolts or screws 6 is a bumper supporting arm 7. The forwardly extending end of each arm 7 is formed into a bearing 8, and held in said bearings by respective caps 9 is a bumper rail 10.

The bumper rail 10 is of a tubular construction and comprises a centrally disposed T-fitting 11 and extending from each horizontal branch of the fitting is a tubular length 11ª.

One of the tubular lengths 11ª outwardly of a bearing 8 is provided with a pair of longitudinal slots 12, said slots being oppositely disposed and mounted in said slots at one end is a bolt 13 and mounted in the opposite end is a bolt 14. Mounted in the slotted tubular length between the bolts 12 and 13 is a coil spring 15 and mounted on the tubular length between the bearing 8 and the bolt 14 is a washer 16.

The outside edge of the bearing 8 of the arm 7 on the right hand frame 1 is provided with a recess 17 and whereas the cap 9 of said bearing is provided with a pair of recesses 18 and 19, said recesses being for the reception of a stop pin 20 which is carried by the right hand tubular length 11ª.

The bumper rail 10 is turnably mounted in the bearings 8 of the arms 7 and disposed in the vertical branch 21 of the T-fitting 11 is a lifting jack 22. The lifting jack comprises a tubular length 23 which is adapted to be adjustably positioned in the T-fitting 11 by the set screw 24, said set screw engaging a key 25 which is secured to the tubular length 23 and is slidably located in a key-way 24ª formed in the T-fitting 11. One end of the tubular length 23 is provided with a shoulder 26 and formed in said shoulder is a bearing 27 and mounted in said bearing is an extending end 28 of a spiral shaft 29, the extending end 28 of said shaft being secured to an end block or knob 30 by a pin 31, said knob engaging against one side of the shoulder 26 whereas a collar 32 on the shaft 29 engages the opposite side of said shoulder.

Mounted within the tubular length 23 is a tubular leg 33, one end of said leg having a threaded opening 34 for the reception of the spiral shaft 29 and secured to the opposite end of said leg by a pin 35 is an end block or knob 36. The end knob 30 is provided with a lug 37 which is flat sided on its exterior for engagement with the socket end 38 of an operating tool 39, said lug 37 having a polygonal shaped recess 40 for cooperation with the polygonal shaped end 41 of the tool 39.

When the automobile equipped with this improved combined bumper and jack is travelling, the jack 22 can be carried in a vertical position as shown in Figs. 1, 2 and 3 or the jack may be inclined in a horizontal position as shown in dotted lines in Fig. 1. When the jack is held in the vertical position during the travel of the automobile, the stop pin 20 is engaged in the recess 17, the stop pin therefore holding the jack in the vertical carrying position. In the event that it is desired to carry the jack during travel of the automobile in a horizontal position, the right hand finishing block or knob 42 which is secured over one end of the bumper rail 10 is engaged and pulled outward thereby pulling the bumper rail longitudinally and the washer 16 by reason of it bearing against the left hand bearing 8 of the arm 7 will cause the bolt 14 to compress the spring 15. This longitudinal pulling out movement of the bumper rail will disengage the stop pin 20 from the recess 17, and the bumper rail is turned rearward a distance until the stop pin is opposite the recess 19 and upon release of the knob 42 of the bumper rail, the spring 15 will become active on the bolt 13 and the rail 10 will be moved to its normal position and in which the stop pin 20 will be engaged in the recess 19, the jack 22 then being held in a horizontal position.

In the event a puncture in one of the front wheels is developed during travel of the automobile, and the jack 22 has been carried in the vertical position shown in Figs. 1, 2 and 3 serving as a radiator guard in combination with the bumper rail 10, the right hand knob 42 of the bumper rail is engaged and pulled outward and the stop pin 20 will be disengaged from the recess 17 and the bumper rail is then turned in a right hand direction thereby swinging the upwardly extending end of the jack 22 forwardly and downwardly until the jack again assumes a vertical position and in which the stop pin 20 will be opposite the recess 18. The drawing out pressure on the knob 42 is then released and the spring 15 of the bumper rail 10 will move the bumper rail to its normal position and in which the stop pin 20 will engage in the recess 18 thereby holding the jack in a vertical lifting position. In this position the end block or knob 30 will be uppermost and the tool 39 can be engaged in the manner shown in Fig. 4 in which the polygonal shaped end 41 is inserted in the vertical shaped recess 40. The jack is then ready to be operated downwardly and by reason of the shaft 29 having a left hand spiral thread, the tool when turned crankwise in a right hand direction will cause the spiral shaft 29 to travel outwardly from the threaded opening of the tubular leg 33 and in which the leg will be extended from the tubular length 23 and as said end block or knob 36 is engaged against the road-way or pavement, and the tool 29 is continued to be operated, the front part of the vehicle will be elevated and the wheels 5 thereof raised above the road-way for removal of the punctured tire. Previous, however, to the lifting jack being operated, the chain 43 of each holding hook 44 is disengaged from respective bolts 2 and the hooks are permitted to swing rearward wherein they will underengage the front axle 4, the hooks thereof holding the side frames 1, springs 3, and the front axle 4 together during the elevating of the vehicle by the jack and the springs 3 of the vehicle will therefore not be permitted to spread.

In practise it is preferable to have the jack 22 adjusted in the fitting 11 in a position wherein when the jack is swung down, the end block 36 will be relatively close to the road-way when an adjacent tire is flat therefore any desired adjustment can be made by manipulation of the set screw 24 against the key 25.

After a tire has been repaired or replaced, the tool 39 is manipulated so as to draw the tubular leg 33 into the tubular length 23. The knob 42 is then engaged and pulled outwardly for disengaging the stop pin 20 from the recess 18 and the bumper rail 10 is then turned in a left hand direction for swinging the jack into a vertical or horizontal position.

For preventing the tubular leg 33 from turning with the spiral shaft 29, said leg is provided with a vertical slot 45 in which a pin 46 is engaged, said pin being secured to the tubular length 23.

When the jack 22 is disposed in a horizontal position in addition to it being held in this position by the stop pin 20 engaging the recess 19, the extending end of the jack will be further supported by the brace 47.

In the event that the driver of the vehicle overlooks returning the jack to an inoperative or carrying position after making a tire change, the bumper rail 10 is placed in cooperation with an electrical circuit such as the ignition circuit of the vehicle. The circuit comprises a wire 48 which may lead from the battery and a wire 49 which may extend to the motor, the wire 48 being grounded on one of the side frames 1 and the wire 49 being connected to the contact finger 50 which is mounted on the insulated block 51 carried by the arm 7. Mounted on the bumper rail 10 is a collar 52 having a raised segmental contacting portion 53 formed on its periphery. When the jack 22 is in an inoperative position the finger 50 will be in contact with the contacting portion 53 as shown in Figs. 1 and 6 but when the jack is in a lifting position the contact between the finger 50 and contact portion 53 is broken thereby cutting off the electrical circuit and in consequence the motor cannot be started by the driver and obviously the driver will have to elevate the jack to a carrying position before the motor can be started. This will prevent the driver from dragging the ground engaging end of the bumper.

The modification disclosed in Fig. 5 shows a different means for primarily lengthening the jack before the lifting operation is applied. In this connection the tubular leg 33$^a$ in addition to having a threaded opening 34$^a$ at one end is provided with a threaded opening 34$^b$ at its opposite end and engaged within the leg 33 is an exteriorly threaded tubular extension 54 the threads of which engage the threaded opening 34$^b$ and secured to the outer end of the extension 54 is a ground engaging knob 55. In the operation of this modified construction, if it is desired to lengthen the jack before the lifting operation is applied, the knob is turned in a direction so as to withdraw a part of the extension 54 from the leg 33$^a$ a desired distance so as to approximately engage the ground.

What I claim is:

1. A bumper for an automobile having a transversely disposed horizontal rail, a member carried by said rail extending at an angle thereto, and an operating element carried by said member adapted to be projected therefrom for elevating a part of the automobile.

2. A bumper for an automobile having a transversely disposed horizontal rail, a swingable member carried by said rail extending at an angle therefrom, and an operating element carried by said member adapted to be projected therefrom for elevating a part of the automobile.

3. A bumper for an automobile having a transversely disposed horizontally held rail, a member carried by said rail angularly disposed thereto adapted to be swung and held in different positions, and an operating element carried by said member adapted to be projected therefrom for elevating a part of the automobile.

4. A combined bumper and lifting jack for an automobile comprising a bumper rail, a swingable member connected to said rail and disposed transversely thereof, said member adapted to be swung to different positions of inclination, and an operating element carried by said member adapted to be projected therefrom for elevating a part of the automobile.

5. A bumper for an automobile having a horizontal rail, a member carried by said rail extending at an angle thereto, an operating element carried by said member adapted to be projected therefrom for elevating a part of the automobile, and means on the operating element for wrench engagement.

6. A bumper for an automobile having a transversely disposed horizontally turnable rail, a member carried by said rail extending at an angle therefrom, and turnable therewith, and an operating element carried by said member adapted to be projected therefrom for elevating a part of the automobile.

7. A bumper for an automobile having a longitudinally disposed turnable rail, a member carried by said rail disposed at an angle thereto, said rail adapted to be turned and held in different positions, and an operating element carried by said member adapted to be projected therefrom for elevating a part of the automobile.

8. A bumper for an automobile having a horizontally disposed turnable rail, a member carried by said rail disposed at an angle thereto, said rail adapted to be turned to different positions, means for locking the rail in the differently turned positions, and an operating element carried by said member adapted to be projected therefrom for elevating a part of the automobile.

9. A bumper for an automobile having a horizontally disposed turnable and longitudinally slidable rail, a lifting jack carried by said rail and locking means for holding the rail in differently turned position, said rail when moved longitudinally adapted to release the locking means.

10. In combination, an automobile frame, an axle, springs between the frame and axle, supporting arms projected from said frame, a bumper rail longitudinally supported by said arms, a swingable member carried by said rail extending at an angle thereto, an operating element carried by said member adapted to be projected therefrom for elevating a part of the automobile, and means for underengaging said axle for holding said frame springs and axle together.

11. A combined bumper and jack for a vehicle, comprising arms extending longitudinally of the vehicle frame, a transversely disposed cross bar turnably mounted in said arms, and a jack connected to the cross bar for lifting a part of the vehicle.

12. A lifting jack for a vehicle comprising a unitary structure turnably connected to the ends of the vehicle frame, and a jack connected to the structure for lifting the vehicle.

13. A lifting jack for a vehicle comprising a unitary cross bar transversely connected to the ends of the vehicle frame, and a jack embodied in the bar intermediate of its ends for lifting the vehicle.

14. In a vehicle, the combination of a frame, a lifting jack supported from the ends of the frame, said jack comprising a pair of telescoping members and a screw cooperable therewith, and wrench engaging means formed on one end of the screw for turning said screw.

15. In a vehicle, the combination of a frame, a rail of a unitary construction supported by the ends of said frame and extending transversely thereof, a lifting jack supported by said rail intermediate of the ends thereof, a lifting screw carried by said rail, and wrench engaging means at one end of the screw for the application of an operating tool.

16. A lifting jack connected to a vehicle frame for raising or lowering said vehicle, said jack comprising an adjustable slide connected to the frame and adapted to drop down near the base on which the vehicle may be standing and a member adapted to be projected from said slide for lifting the vehicle.

17. In a vehicle, the combination of a frame, a turnable rail supported by the ends of said frame and extending transversely thereof, a lifting jack supported by said rail intermediate of the ends thereof, a screw in said jack, wrench engaging means at one end of the screw for the application of an operating tool and locking means for preventing said rail from turning.

18. A lifting jack adapted to be connected to a vehicle for raising or lowering said vehicle, an electrical circuit cooperable with the jack, said circuit adapted to break when the jack is in a lifting position and to close when the jack is in a normal position.

19. A combined bumper and jack for a vehicle comprising a bumper rail, a lifting member carried by said rail, said lifting member adapted to be moved to a position of lifting operation for lifting a part of the vehicle, an electrical circuit cooperable with said rail and means for breaking the circuit when the lifting member is in lifting position.

20. A combined bumper and lifting jack for an automobile comprising a bumper rail, a swingable member connected to said rail and disposed transversely thereof, said member being swingable to different positions of inclination, locking means for said member, and an operating element carried by said member adapted to be projected therefrom for elevating a part of the automobile.

21. A combined bumper and lifting jack for an automobile comprising a bumper rail, a swingable member connected to said rail and disposed transversely thereof, said member being swingable to different positions of inclination, locking means for said member, resilient means cooperable with said locking means, and an operating element carried by said member adapted to be projected therefrom for elevating a part of the automobile.

22. A bumper for an automobile comprising a guard rail, a vertically disposed member carried by said rail, and an operating element carried by said member adapted to be projected downwardly therefrom for elevating a part of the automobile.

23. A bumper for an automobile comprising a transversely disposed rail, and a jack carried by said rail adapted to be lowered for lifting a part of the vehicle while the bumper rail retains its normal position.

24. A bumper for an automobile comprising a guard rail, a vertically disposed member carried by said rail, an operating element carried by said member adapted to be projected downwardly therefrom for elevating a part of the automobile, an electrical circuit cooperable with said rail, and means for breaking the circuit when said operating element is in a lifting position.

ALBERT C. HOECKER.